Dec. 12, 1967    J. M. TOPAZ    3,357,230
METHOD AND APPARATUS FOR CALIBRATING CAMERA PHOTOMETER
Filed Dec. 9, 1964    2 Sheets-Sheet 1

INVENTOR
Jeremy M. Topaz
BY Brown and Mikulka
and
Donald M. Sandler
ATTORNEYS

Dec. 12, 1967  J. M. TOPAZ  3,357,230
METHOD AND APPARATUS FOR CALIBRATING CAMERA PHOTOMETER
Filed Dec. 9, 1964  2 Sheets-Sheet 2

INVENTOR
Jeremy M. Topaz
BY Brown and Mikulka
and
Donald M. Sandler
ATTORNEYS

United States Patent Office 3,357,230
Patented Dec. 12, 1967

3,357,230
METHOD AND APPARATUS FOR CALIBRATING CAMERA PHOTOMETER
Jeremy M. Topaz, Brighton, Mass., assignor to Polaroid Corporation, Cambridge, Mass., a corporation of Delaware
Filed Dec. 9, 1964, Ser. No. 417,037
2 Claims. (Cl. 73—1)

This invention relates to cameras employing comparison photometers by which the exposure value of the shutter mechanism can be functionally related to the brightness of the scene being photographed, and more particularly to a method and apparatus for calibrating the photometer so that at balance, the exposure value of the shutter mechanism is correct for a preselected film speed.

One form of camera of the type described employs a fixed speed shutter operatively associated with the exposure aperture of an adjustable diaphragm, the latter also defining a photometer aperture that is operatively associated with a comparison photometer. The diaphragm is constructed and arranged so that each aperture is changed in the same proportion when the diaphragm is adjusted. The photometer includes a target having a first portion which is illuminated by light from the scene that passes through the photometer aperture and a second portion which is illuminated by light from a standard lamp. A balanced condition exists when the two portions of the target are equally bright. Since the speed of the shutter is fixed, the amount of light passing through the exposure aperture and incident on the film plane in response to operation of the shutter, will be functionally dependent on the position of the diaphragm. At photometric balance, however, such position is determined by the radiant output of the photometer lamp since such output fixes the brightness of the second portion of the photometer target. Therefore, the amount of light incident on the film plane of the camera due to operation of the shutter will have a fixed value which is independent of the scene brightness (provided only that the diaphragm is adjusted prior to shutter operation to achieve photometric balance) but which is functionally dependent on the brightness of the second portion of the photometer target.

If the design criteria for the camera call for the use of film of a given speed thus fixing the amount of light required to be passed by the shutter to achieve proper exposure, then the brightness of the second portion of the target is uniquely determined. The problem then is to provide a lamp whose radiant output is such that the brightness of the second portion of the target has the proper value. Generally, the design criteria also provide for a lamp selected to satisfy life and cost requirements, so that the problem reduces to providing some control by which the radiant output of the lamp can be adjusted to produce the proper value of brightness on the second portion of the photometer target. Conventionally, the control is achieved by inserting in the lamp circuit a variable resistor for the purpose of adjusting the lamp voltage since the latter determines the radiant output of the lamp. In an inexpensive photometer, this resistor is a relatively costly item; and this approach to calibration means that lamp life, which is dependent on lamp voltage, will depend upon the calibration adjustment of the resistor thus preventing consistency in lamp life as between various photometers calibrated in this manner. Therefore, one of the objects of the present invention is to provide means for controlling the brightness of the second portion of the photometer target without controlling the lamp voltage.

This object is achieved by measuring the overexposure error upon operation of the shutter after photometric balance is achieved, and inserting between the lamp and the photometer target a light attenuator which serves to decrease the brightness of the second portion of the photometer target by an amount that will reduce the exposure error substantially to zero upon operation of the shutter after the photometer is rebalanced with the attenuator in place.

From the above method of calibration, it should be obvious that the ability to achieve photometric balance during calibration is critically important. Where calibration is to be accomplished on a production line basis by visually observing the photometer target and adjusting the diaphragm to achieve balance, then measuring the overexposure error, then selecting the light attenuator based on such error and inserting the same into the camera, and then rebalancing the photometer to check whether the exposure error has been reduced to zero, It is reasonable to conclude that eye fatigue will adversely affect the ability of an operator to achieve photometric balance within close tolerances, rapidly and consistently. The eye fatigue problem arises primarily because of the nature of the photometer target which must be viewed by peering into an aperture about ¼" square. To eliminate brightness variation due to color, a deep red filter is placed in the aperture so that the observer views light from both portions of the target through the filter. Because the lamp is small and battery operated, its output is low and the target is relatively dim in comparison to ordinary ambient light. Since the calibration cycle requires the operator to study a small, dim target alternately with reading an exposure-error meter in ordinary light, the necessity for constantly adapting the eye to different levels of average brightness greatly increases the likelihood that errors in establishing photometric balance will increase with time spent in calibration. It is a solution to this problem that is a further object of the present invention.

This further object is achieved by monitoring the photometer target with a television camera. For most applications, it is generally assumed that there is a substantially linear relationship between the light input to a properly adjusted camera and the light output from a properly adjusted monitor. Actually, however, the relationship is nonlinear, and this nonlinearity can be increased by selectively changing the brightness and contrast controls of the monitor. As a result, differences in brightness of adjacent elemental areas of the target are accentuated on the monitor. This artificial difference in brightness permits an operator to more easily balance the photometer within in preselected tolerance; and the enlarged display of the target with a substantial increase in overall brightness eliminates the cyclic requirement for adapting the eye to different light levels and thus materially reduces eye fatigue.

A still further object of this invention is to automate the balancing of the photometer, and the accomplishment of the object is based on a recognition that there is a frequency component in the television camera output signal that is peculiar to the location and distribution of the first and second portions of the photometer target. Adjustment of the diaphragm until this frequency component is minimized permits photometric balance to be achieved without resort to visual comparison by an observer of the photometer target.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention.

For a fuller understanding of the nature and objects of the inventioin, reference should be had to the following detailed description taken in connection with the accompanying drawings wherein.

FIGS. 3a, b and c represent the photometer target as seen by an observer under three different photometric conditions;

FIGS. 4a, b and c represent reproductions on a television monitor of the photometer targets shown in FIGS. 3a, b and c.

Figure 7:
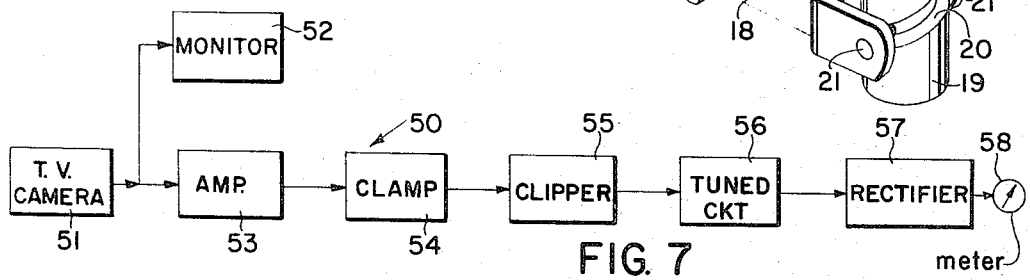
Figure 8:
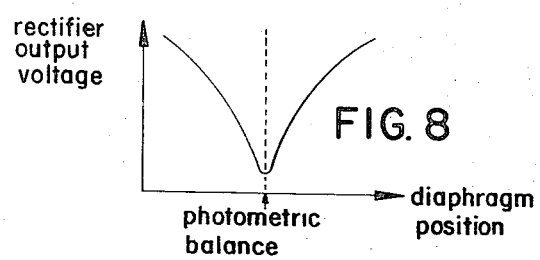
Figure 5:
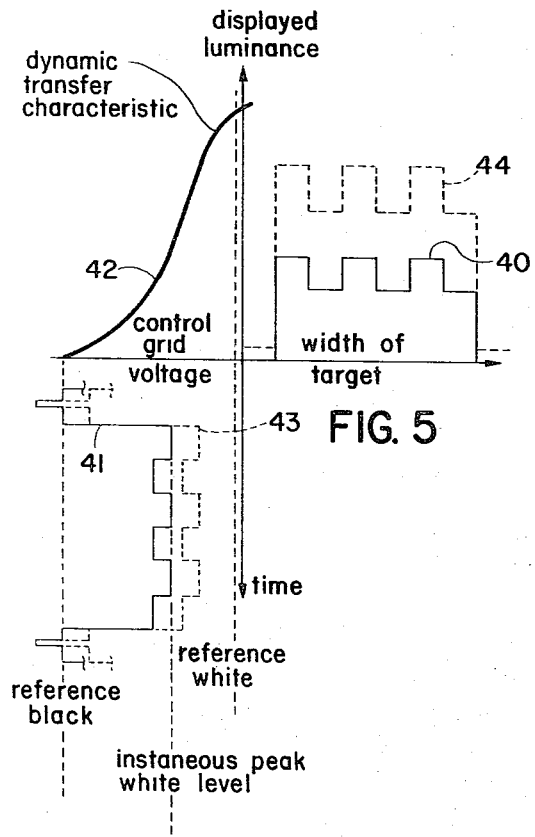
Figure 6:
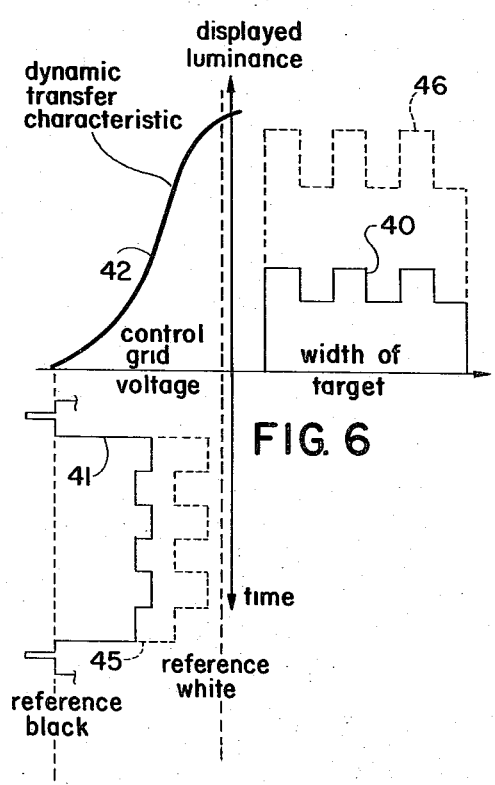

FIG. 5 shows the effect of varying the brightness control of the television monitor for a square law kinescope when the line L shown in FIG. 3a is scanned;

FIG. 6 shows the effect of varying the contrast control of the television monitor for a square law kinescope when the line L shown in FIG. 3a is scanned;

FIG. 7 is a block diagram showing a setup by which an automatic indication is provided when photometric balance is achieved; and FIG. 8 is a plot which shows the variation of the rectified output of the tuned circuit shown in FIG. 7 in response to variations in the photometer diaphragm opening.

Figure 1:
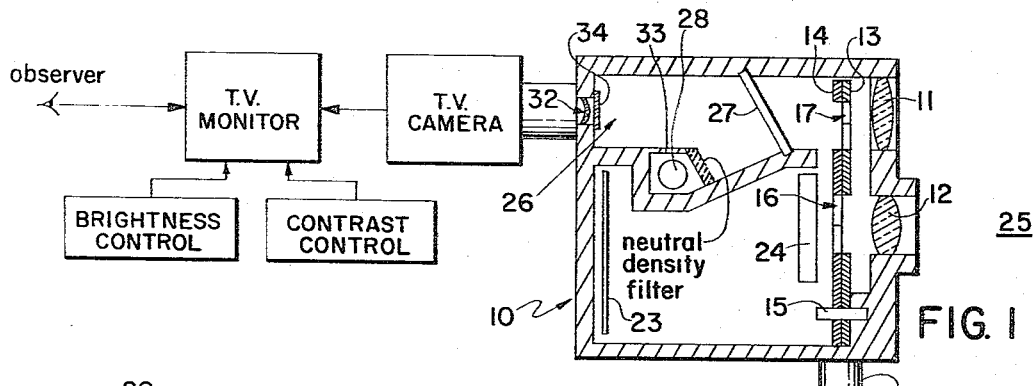
FIGURE 1 is a sectional view of a camera into which a comparison photometer is reproduced and includes a schematic showing of a television link between the photometer viewfinder and the observer.

Referring now to FIGURE 1, a camera of the type described is designated by reference numeral 10 and is shown as including an outer housing containing in the front face, photometer lens 11 and exposure aperture lens 12. Internal of the camera are a pair of diaphragm blades 13, 14 pivotally mounted at 15 on the housing. The blades constitute diaphragm means that contain exposure aperture 16 and photometer aperture 17 that are individually aligned with lenses 11 and 12 respectively. As shown best in FIG. 2, the two blades each have arms 18 in the region of pivot 15 that extend radially from the pivot and surround opposite sides of a rotatable cam 19 having a helical groove 20 that engages cam follower means 21 on the free ends of the arms. Manual rotation of knob 22 rigidly attached to cam 19 imparts, through the interaction of the cam followers with the groove, a "scissors" movement to the two blades. As a result, both the exposure and photometer apertures change in the same proportion when knob 22 is rotated to adjust the diaphragm means.

Between the diaphragm blades and film 23 positioned on the film plane is fixed speed shutter 24, which is entirely conventional. Manual operation of the shutter release (not shown) causes the shutter to open and close in about 1/30 of a second and so control the amount of light from the scene 25 being photographed passing through exposure aperture 16 and falling on film 23. Since the shutter speed is fixed, the exposure aperture must be varied to change the exposure value of the shutter mechanism (which includes the shutter and the diaphragm blades). Hence, using film of a given speed establishes the required exposure aperture as a function of scene brightness.

Figure 2:
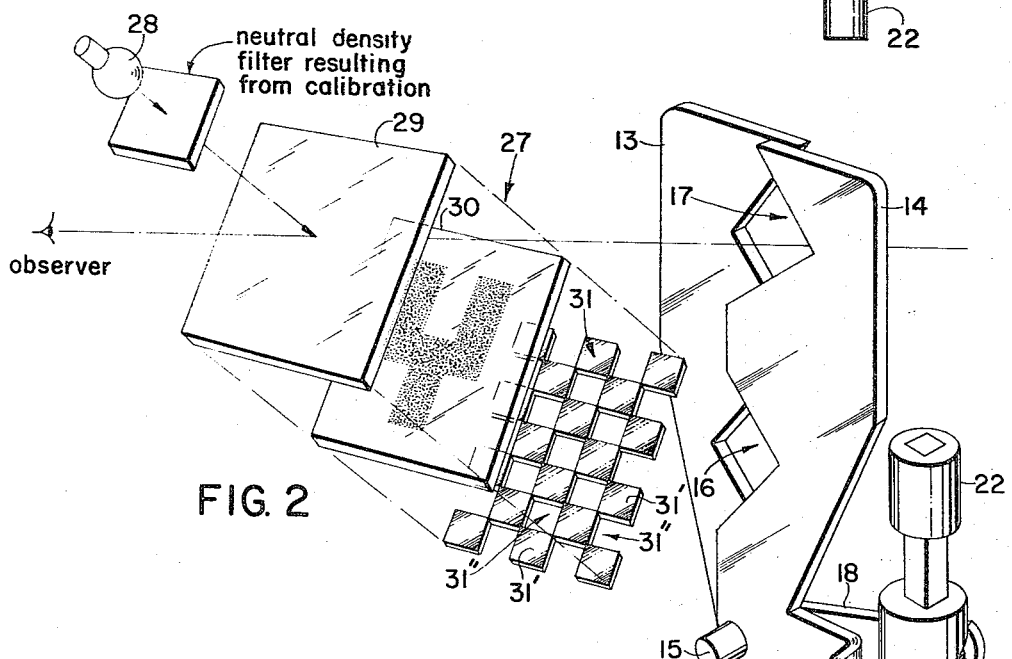
FIG. 2 is a schematic representation of the photometer target (shown in exploded form) and the diaphragm means by which light from the scene being photographed and incident on the photometer target can be selectively changed.

To control the exposure aperture as a function of scene brightness comparison photometer 26 is utilized. The main components of the latter, in addition to the diaphragm blades defining the photometer aperture, are photometer target 27 and standard lamp 28. Target 27 is constituted by a photographic transparency, upon the emulsion surface of which is printed a confusing pattern in opaque white ink. Referring now to FIG. 2, target 27 comprises a transparent main support 29, emulsion layer 30 and pattern 31. Layer 30 defines an index symbol (designated here for illustration purposes as the letter "Y," it being understood that any word or symbol could be used) rendered visible by the fact that it is defined by a uniform arrangement of separate totally light absorbing dots. Pattern 31, shown in FIG. 2 as squares 31' of opaque white ink, when printed on emulsion layer 30 is seen by an observer looking through the main support 29 as diffuse white squares. Therefore, an observer looking through photometer viewfinder 32 at target 27 will see the index symbol superimposed on the background pattern. The light from standard lamp 28 incident on diffuse pattern 31 will be reflected from squares 31' into the eye of the observer. Light from the scene being photographed is suitably diffused at 11 and passes through photometer aperture 17. The observer sees the diffused light from the scene through the interstices 31'' of pattern 31. Photometric balance is achieved by the observer manually adjusting the diaphragm means until the pattern and the interstices are equally bright. In such case, the index symbol becomes intelligible against a uniformly bright background. For reference purposes then, the target can be described as having a first portion (pattern interstices) illuminated by light from the scene passing through the photometer aperture; and a second portion (pattern) illuminated by light from the standard lamp, with photometric balance being that condition when the brightness of each of the portions are equal.

Figure 3:
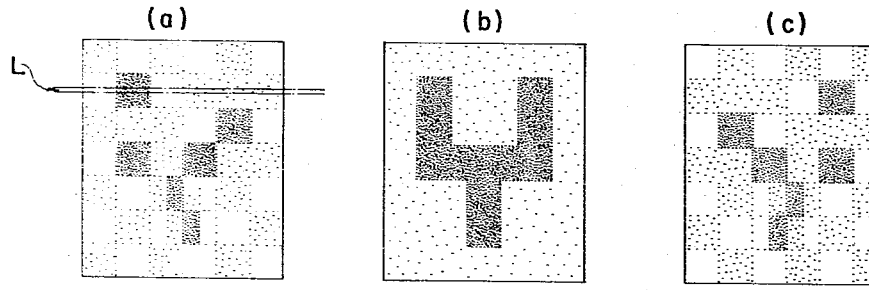

FIG. 3 represents what an observer would see looking through viewfinder 32 under the three possible conditions: pattern brighter than interstices, FIG. 3a; pattern and interstices equally bright, FIG. 3b; and pattern less bright than interstices, FIG. 3c. As indicated, the index symbol is visible under each condition, but is intelligible only at balance. Therefore, in using the photometer, the observer would watch the photometer target while adjusting knob 22, continuing until the symbol becomes intelligible. Light baffle 33 between the viewfinder 32 and lamp 28 keeps direct rays from the lamp out of the observer's eye, while red filter 34 serves to eliminate brightness differences due to color, although it may be desirable to use separate red filters for both the lamp and the scene light when increased accuracy is necessary.

From the above, it can be seen that by balancing the photometer, an observer can make the exposure aperture functionally related to scene brightness. It is necessary, of course to calibrate the photometer so that this functional relationship is correct for the film speed chosen. Briefly, the calibration process involves adjusting the diaphragm until photometric balance is achieved, operating the shutter release to cause light from scene 25 (a uniformly illuminated surface for calibration purposes) to fall on a light integrating device, measuring the overexposure error, and selecting on the basis of this error, a light attenuator which when placed between the lamp and the pattern will reduce the pattern brightness by an amount such that on rebalancing the photometer with the attenuator in place, the exposure error reduces substantially to zero.

For reference purposes, the term exposure error is related to the ratio of the amount of light actually passed by the shutter with the photometer in balance to the amount of ligh required by film of a given speed to achieve correct exposure. Generally, the error is expressed in "stops" which is the logarithm to the base two of this ratio and will be positive for overexposure, zero for correct exposure, and negative for underexposure. Thus, the original design of the relative sizes of photometer and exposure aperture must be such that, taken with the radiant output of the average lamp, the exposure error will be positive without any attenuator present. Alternatively, however, a neutral density filter could be inserted between the scene and the target; and in such case, the design would have to be such that the exposure error was negative without the filter being present. A suitable light integrating device is a photoconductor in series with a capacitor. If, when the shutter is opened, a step voltage is applied to the series circuit, the time constant of which is long in comparison to the duration of exposure, the voltage across the capacitor at the closing of the shutter will be a measure of the time integral of the light incident on the photoconductor.

In order to prevent eye fatigue, arising from cyclic light level adaptation, from interfering with accurately balancing the photometer during an assembly line calibration operation, the photometer target of the camera under calibration can be monitored via a television camera. This provides the operator with a relatively bright, enlarged view of the target that can be seen in normal ambient light with much less eye strain than would be the case were the operator required to peer, with only one eye open, into the relatively small photometer viewfinder aperture to study a relatively dimly illuminated target. While this approach significantly reduces eye fatigue and facilitates calibration, it also gives rise to the possibility of balancing the photometer to a closer tolerance without requiring greater skill on the part of the operator. This important result can be achieved because of the nature of the relationship of the output light from the screen of a monitor to the input light to the camera. By analogy, the term "system gamma" is used herein to denote this relationship, although technically, gamma is the exponent of that power law which is used to approximate the curve of output magnitude vs. input magnitude over the range of interest. For most purposes, the system gamma can be considered as being unity which in this context means that a given difference in brightness between adjacent elemental areas of the photometer target is preserved when the corresponding elemental areas are reproduced on the monitor. Actually, this is only approximately true as can be seen from the following review of the transfer characteristics of a typical camera and kinescope. For example, the signal output of a 6198 or 6326 vidicon pickup tube varies approximately as the 0.65 power of the incident illumination. A typical kinescope on the other produces a light output that varies approximately as the 2.2 power of the input signal. Since the overall or system gamma is the product of the gammas of the individual components, it can be seen that the gamma of the pickup tube is almost complementary to the gamma of the kinescope. The fact that the overall gamma actually exceeds unity is advantageous because a given difference in brightness between the pattern and the interstices between the pattern elements of the photometer target is increased when the latter is displayed on the kinescope of the monitor. Thus, an observer viewing the kinescope would be under the impression that the photometer were further out of balance than is actually the case. Hence, by rotating knob 22, the observer can more easily achieve a balanced condition since the change in brightness between the two reproduced portions of the target increases more rapidly in response to rotation of knob 22 than the actual change in brightness.

Figure 4:
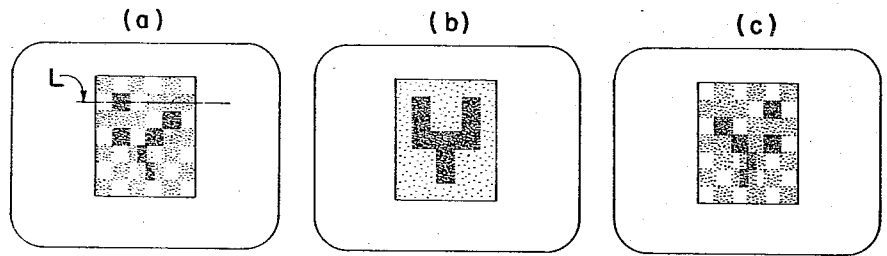

The effect of having a system gamma which exceeds unity can be seen by comparing FIG. 4 with FIG. 3. The latter, it will be recalled, represents how the photometer target would appear to an observer looking into viewfinder 32 under three conditions of diaphragm adjustment. In FIGS. 3a and 4a the pattern is brighter than the interstices, but the contrast between the dark and light areas is more apparent in FIG. 4a because this represents how the target would appear on the kinescope of the television monitor. At balance, FIG. 3b and FIG. 4b are the same, while each of FIGS. 3c and 4c is the inverse of FIGS. 3a and 4a respectively.

The inherent ability of the television link between the observer and the photometer target to accentuate differences in brightness between adjacent areas on the target can be enhanced by the fact that two linear operations are performed on the camera signal before it is applied to the input terminals of the kinescope. One of these is adjustment of the voltage interval between the pedestal level and the reference white level; and the other is addition of a suitable D-C voltage.

The first operation serves to match the amplitude range of the signal waveform to the useful drive-voltage range of the dynamic transfer characteristic of the kinescope. This operation is achieved by suitable adjustment of the "contrast" control of the receiver. The other operation serves to position the signal on the proper portion of the transfer characteristic, and is achieved by suitably adjusting the "brightness" control. The object of these controls is to permit the viewer to change the contrast characteristics of the reproduced picture until they appear correct to him. In principle, these adjustments are intended to yield a drive-signal which just cuts off the scanning beam current whenever the camera signal corresponds to the reference block level, and which raises it to the maximum useful value whenever the amplitude of the camera signal is that of the reference white level.

As indicated previously, the contrast control adjusts the amplitude range of the signal and the brightness control setting determines the magnitude of the additive D-C biasing signal. The effects of adjusting these controls on the contrast characteristics of the reproduced picture are shown in FIGS. 5 and 6. For illustrating the principles involved, it will be assumed that the photometer is out of balance, with the pattern being brighter than the interstices as shown in FIG. 3a. The variation in brightness along the line marked "L" in FIG. 3a (which represents the scene being televised) is indicated by curve 40 in each of FIGS. 5 and 6, assuming that the exponential characteristic of the receiver is just complementary to the logarithmic characteristic of the camera. The drive signal necessary to produce curve 40 is shown at 41 in each of FIGS. 5 and 6, it being understood that the brightness control is adjusted to place the reference black level at the tube cut-off, and the contrast control is adjusted to place the reference white level at the maximum usable current position on the dynamic transfer characteristic 42 of the picture tube.

A change in the brightness control that shifts the reference black above tube cut-off to the position shown by curve 43 will cause line L to be reproduced on the monitor with brightness variations as shown by curve 44. Inspection of curve 44 indicates that this change will provide considerable more contrast between the light squares and the dark squares in the reproduced picture than in the original scene. Likewise, a change in the contrast control that extends the amplitude range of the applied video signal to the position shown by curve 45 will cause line L to be reproduced on the monitor with brightness variations as shown by curve 46. Here too, such change will increase the contrast. Thus, both the contrast and brightness controls of the monitor are available to increase the contrast between the pattern and the interstices. Since the ability of the eye to distinguish detail is poor at extremely low levels of illumination, and improves with increasing light intensity, it is preferred to operate the monitor such that the average light level is intermediate the extremes available by adjusting the brightness control, even though the degree of contrast available here is somewhat less than that available with the brightness control adjusted toward the lower end of the scale.

The above theoretical treatment of the effect of the overall gamma of the television link on contrast is applicable to the usual type of scene normally televised. However, in the present case, where the scene is in effect a checkerboard of light and dark adjacent areas, the maximization of contrast with a given camera/monitor system can be obtained in a somewhat unconventional manner. Recalling that the contrast between adjacent areas in a common field is dependent on the ratio of brightness of the individual areas rather than on the differences in brightness, it is clear that the contrast as seen on the monitor will be maximized when the camera/ monitor system is operated to maximize the ratio of the brightness of individual areas. This is achieved in a practical manner by making the gain of the monitor as high as possible (turning up the contrast control to its maximum position), and adjusting the brightness control as described below, with the diaphragm position fixed at some predetermined unbalanced condition, and the photometer in proper calibration. The brightness control is adjusted until the video level representing the scanning of the darker portions of the photometer target is in the vicinity of the cut-off voltage of the kinescope. Thus, only the brighter portions of the photometer target will be visible on the monitor. Adjustment now of the diaphragm means toward balance will cause the darker portions of the photometer target to remain visible on the monitor but decrease in brightness. At balance, the target as seen on the monitor will be uniformly bright. The predetermined unbalanced condition of the photometer at which the brightness control is set as described above is somewhat arbitrary, and is selected merely on the basis of requiring a reasonable amount of adjustment to be required to move the photometer from its unbalanced to its balanced condition and detect a reasonable contrast change on the monitor. With the above approach, no further adjustment of the monitor controls will be necessary in order to maximize the contrast while balancing the photometer with the latter out of calibration, as long as the degree of miscalibration is within reasonable limits.

In order to automate the calibration process, it is necessary to detect the balance condition automatically, and to do this, advantage can be taken of a frequency component in the video signal derived from the camera that is peculiar to the pattern on the photometer target. If the pattern is as suggested in FIG. 2, namely equally spaced squares aligned with the direction of scanning, it can be seen that the video signal will be of the form shown by curve 41 in FIGS. 5 and 6. Actually, the target may take up less than the whole raster and may appear like that shown in FIG. 4. In any event, with a given optical magnification, number of squares to the width of the pattern, scanning speed, etc., the regular checkerboard pattern will develop a fundamental frequency in the video signal. For example, with 24 squares (12 pattern squares and 12 interstices), and a magnification and scanning system such that the beam requires about 40 μsec. to scan from one end of the target to the other, there will be a fundamental frequency $f$ present that can be calculated as follows:

$$f = (1/2)(24)\left(\frac{1}{40 \times 10^{-6}}\right) = 300,000 \text{ c.p.s.}$$

FIG. 7 shows a setup 50 for monitoring the camera signal to detect the presence of the 300 kc. signal. Television camera 51 is of course focused on the photometer target as shown in FIGURE 1, and the magnification adjusted to produce the desired scan time (in the situation above, this is 40 μsec.). The operator, viewing monitor 52 and visually noting the unbalanced condition would then rotate knob 22 of the camera under calibration in an attempt to balance the photometer. The camera output signal, after amplification at 53 would be clamped at 54 to the peak white level of the signal. Clipping at a low level, for example 1.5 volts would then be achieved at 55 producing, during the scanning of the target, what is essentially a 300 kc. square wave. This provides the input to a 300 kc. tuned amplifier at 56 whose output after rectification at 57 drives D-C meter 58. The response of setup 50 to rotation of knob 22 of the camera under calibration is similar to that shown in FIG. 8 where it can be seen that the amount of 300 kc. signal present due to the visible checkerboard pattern will reach a minimum at photometric balance (since the visible checkerboard pattern disappears at this condition). Thus, in operation, the person calibrating a camera would only have to cause meter 58 to reach a minimum value to know that the photometer is balanced. Knowing this to be the case, the previously described calibration technique could be used to determine the amount of attenuation necessary to be inserted between the lamp and the target of the photometer.

It has been found experimentally, that the presence of the index symbol does not adversely interfere with the automated approach outlined above. The presence of such symbol apparently contributes some 300 kc. components to the video signal when the symbol is scanned, but they are too small to significantly affect the meter reading. Furthermore, the use of discrete discontinuous dots to define the index symbol produces very high video components that are far removed from the frequency at which circuit 56 is resonant.

Since certain changes may be made in the above method and apparatus without departing from the scope of the invention herein involved, it is intended that all matter contained in the above description or shown in the accompanying drawings shall be interpreted as illustrative and not in a limiting sense.

What is claimed is:
1. A method for indicating the condition of photometric balance in a comparison photometer of the type employing a target having, in a common field, two portions illuminated individually by two different light sources whose relative intensity can be controlled for equalizing the brightness of said two portions and attaining photometric balance comprising the steps of:
   (a) monitoring said target with a television camera for producing a video signal that includes a component whose frequency is functionally related to the orientation of the target relative to the raster of the camera and the geometry of said two portions;
   (b) adjusting the relative brightness between said two sources; and
   (c) detecting when the adjustment in relative brightness is such that said component is a minimum whereby such adjustment provides photometric balance.

2. A method for calibrating a photometer of a camera of the type comprising: adjustable diaphragm means defining exposure and photometer apertures and constructed and arranged so that each aperture changes in the same proportion when said diaphragm means is adjusted; a shutter associated with said exposure aperture and operable to control the amount of light from a scene being photographed passing through said exposure aperture and falling on the film plane of the camera during a predetermined exposure interval; and a comparison photometer associated with said photometer aperture and including a target having in a common field, a first portion which is illuminated by light from said scene passing through said photometer aperture and a second portion which is illuminated by light from a standard lamp, photometric balance being achieved such that the brightness of each portion is substantially equal; said method comprising the steps of:
   (a) monitoring said target with a television camera for producing a video signal that includes a component whose frequency is related to the orientation of the target relative to the raster of the camera and to the geometry of said two portions;
   (b) adjusting said diaphragm means to vary said photometer aperture and thus the relative brightness between said first and second target portions;
   (c) detecting the point at which the adjustment in relative brightness is such that said component has minimum amplitude indicating photometric balance between the level, of brightness of said first portion of said target and the level of brightness of said second portion of said target;

(d) measuring the quantity of light capable of being received at said film plane at said balance setting of said diaphragm means during a predetermined exposure interval; and (e) inserting a light attenuator between said lamp and said photometer target to decrease the brightness of said second portion of said target to shift the exposure value at which photometric balance on said target is achieved by an amount related to the exposure error detected by said measurement at said film plane.

References Cited

UNITED STATES PATENTS

| | | | |
|---|---|---|---|
| 1,244,159 | 10/1917 | Adsit | 88—23 |
| 1,437,399 | 12/1922 | Comstock | 88—23 X |
| 2,112,701 | 3/1938 | Leity et al. | 95—10 |
| 2,674,917 | 4/1954 | Summerhays et al. | 178—6 X |

OTHER REFERENCES

Meyers et al.: Closed Circuit TV System Planning, John F. Rider Publisher, Inc. New York, 1957, copy in Group 230 TK6680M38C2 page 62 relied upon.

LOUIS R. PRINCE, *Primary Examiner.*

S. CLEMENT SWISHER, *Assistant Examiner.*